US008675859B2

(12) United States Patent
Mandalia et al.

(10) Patent No.: US 8,675,859 B2
(45) Date of Patent: *Mar. 18, 2014

(54) IMPLEMENTING A CONTACT CENTER USING OPEN STANDARDS AND NON-PROPRIETARY COMPONENTS

(75) Inventors: Baiju D. Mandalia, Boca Raton, FL (US); Victor S. Moore, Lake City, FL (US); Wendi L. Nusbickel, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/467,498

(22) Filed: May 9, 2012

(65) Prior Publication Data
US 2012/0219138 A1 Aug. 30, 2012

Related U.S. Application Data

(63) Continuation of application No. 11/680,304, filed on Feb. 28, 2007, now Pat. No. 8,259,923.

(51) Int. Cl.
*H04M 3/00* (2006.01)
*H04M 5/00* (2006.01)
*G06F 15/16* (2006.01)

(52) U.S. Cl.
USPC .......... 379/265.02; 379/265.01; 379/265.03; 379/265.09; 379/265.12; 709/203

(58) Field of Classification Search
USPC .......... 379/265.01, 265.02, 265.03, 265.04, 379/265.05, 265.06, 265.07, 265.08, 379/265.09, 265.1, 265.11, 265.12, 265.13, 379/265.14, 266.01, 266.02, 266.03, 379/266.04, 266.05, 266.06, 266.07, 379/266.08, 266.09, 266.1
See application file for complete search history.

(56) References Cited

U.S. PATENT DOCUMENTS 6,058,163 A * 5/2000 Pattison et al. .......... 379/265.06
6,263,370 B1 * 7/2001 Kirchner et al. .............. 709/230

(Continued)

FOREIGN PATENT DOCUMENTS

EP 1237349 A2 9/2002
EP 1484903 A2 12/2004

OTHER PUBLICATIONS

Kimbrough, S.O., et al., "On Automated Message Processing in Electronic Commerce and Work Support Systems: Speech Act Theory and Expressive Felicity", ACM Transactions on Information Systems, vol. 15, No. 4, pp. 321-367, Oct. 1997.

(Continued)

*Primary Examiner* — Khai N Nguyen
(74) *Attorney, Agent, or Firm* — Patents on Demand P.A.; Brian K. Buchheit; Scott M. Garrett

(57) ABSTRACT

The present invention discloses an open contact center formed from multiple contact center components that conform to open standards and that intercommunicate utilizing open standards. The open contact center can provide automated interactive communications with callers, can provide queue management for callers waiting to communicate with live agents, can provide skills based routing for assigning live agents to callers based upon skills of the live agents and skills needed by the callers, and can provide tooling for provisioning and monitoring the live agents. In one configuration, the contact center components can execute within a middleware solution, such as WEBSPHERE, that has IP Multimedia Subsystem capability. Additionally, the contact center components can be implemented as service oriented architecture (SOA) components that communicate over an enterprise service bus (ESB).

20 Claims, 5 Drawing Sheets

(56) References Cited

U.S. PATENT DOCUMENTS

| | | |
|---|---|---|
| 6,587,558 B2 | 7/2003 | Lo |
| 6,704,396 B2 | 3/2004 | Parolkar et al. |
| 6,798,766 B1* | 9/2004 | Bevan et al. ............... 370/352 |
| 6,898,277 B1 | 5/2005 | Meteer et al. |
| 6,922,466 B1 | 7/2005 | Peterson et al. |
| 6,958,994 B2* | 10/2005 | Zhakov et al. ............. 370/352 |
| 6,970,554 B1 | 11/2005 | Peterson et al. |
| 6,972,761 B1 | 12/2005 | Cox et al. |
| 6,978,247 B1 | 12/2005 | Bogart et al. |
| 6,988,126 B2 | 1/2006 | Wilcock et al. |
| 6,996,605 B2 | 2/2006 | Low et al. |
| 7,003,079 B1 | 2/2006 | McCarthy et al. |
| 7,085,728 B2 | 8/2006 | Sarlay et al. |
| 7,315,616 B2 | 1/2008 | Annadata et al. |
| 7,343,406 B1* | 3/2008 | Buonanno et al. ............ 709/224 |
| 7,457,404 B1* | 11/2008 | Hession et al. .......... 379/265.07 |
| 7,522,542 B2* | 4/2009 | Johnson et al. ............. 370/260 |
| 2002/0055967 A1 | 5/2002 | Coussement |
| 2002/0056000 A1 | 5/2002 | Coussement |
| 2003/0216919 A1* | 11/2003 | Roushar ........................ 704/260 |
| 2005/0047579 A1 | 3/2005 | Salame |
| 2006/0023864 A1 | 2/2006 | Krahn |
| 2006/0029206 A1* | 2/2006 | Anisimov et al. ........ 379/265.03 |
| 2006/0031077 A1 | 2/2006 | Dalton et al. |
| 2006/0098625 A1* | 5/2006 | King et al. ................... 370/352 |
| 2006/0176901 A1* | 8/2006 | Terai et al. ................... 370/465 |
| 2007/0019618 A1* | 1/2007 | Shaffer et al. ................ 370/352 |
| 2007/0026852 A1 | 2/2007 | Logan et al. |
| 2007/0038599 A1* | 2/2007 | Pearson ........................... 707/3 |
| 2007/0147349 A1* | 6/2007 | Bangor et al. ................ 370/352 |
| 2007/0147350 A1* | 6/2007 | Bangor et al. ................ 370/352 |
| 2007/0147597 A1* | 6/2007 | Bangor et al. ........... 379/207.02 |
| 2007/0150480 A1* | 6/2007 | Hwang et al. ................. 707/10 |
| 2007/0266075 A1 | 11/2007 | Jachner |
| 2008/0003964 A1 | 1/2008 | Alperin et al. |
| 2008/0086564 A1* | 4/2008 | Putman et al. ................ 709/227 |
| 2008/0192908 A1 | 8/2008 | O'Keefe et al. |
| 2010/0077082 A1* | 3/2010 | Hession et al. ............... 709/227 |

OTHER PUBLICATIONS

Brabrand, C., et al., "The <bigwig> Project", ACM Transactions on Internet Technology, vol. 2, No. 2, pp. 79-114, May 2002.

Fielding, R.T., et al., "Principled Design of the Modern Web Architecture", ACM Transactions on Internet Technology, vol. 2, No. 2, pp. 115-150, May 2002.

Meng, H., et al., "ISIS: An Adaptive, Trilingual Conversational System With Interleaving Interaction and Delegation Dialogs", ACM Transactions on Computer Human Interaction, vol. 11, No. 3, pp. 268-299, Sep. 2004.

Atkins, D., et al., "Common Presence and Instant Messaging: Message Format," [online] Internet Engineering Task Force, IETF, CH, vol. IMPP, No. 8, Jan. 9, 2003, [retrieved on Feb. 7, 2008] retrieved from the Internet: <http://tools.ietf.org/html/draft-ietf-impp-cpim-msgfmt-08>.

Peterson, J., "Common Profile for Presence (CPP)," [online] Internet Engineering Task Force, IETF, CH, vol. IMPP, No. 4, Aug. 14, 2003, [retrieved on Feb. 7, 2008] retrieved from the Internet: <http://tools.ietf.org/html/draft-ietf-impp-pres-04>.

Sugano, H., et al., "Prsence Information Data Format (PIDF)," [online] Internet Engineering Task Force, IETF, CH, vol. IMPP, No. 8, May 1, 2003, [retrieved on Feb. 7, 2008] retrieved from the Internet: <http://tools.ietf.org/html/draft-ietf-impp-cpim-pidf-08>.

Schulzrinne, H., et al., "RPID: Rich Presence Extensions to the Presence Information Data Format (PIDF)," [online] Internet Engineering Task Force, IETF, CH, Jul. 1, 2006, [retrieved on Feb. 7, 2008] retrieved from the Internet: <http://www.ietf.org/rfc/rfc4480.txt>.

Notice of Allowance dated Dec. 9, 2009 in related application, US Appl. No. 11/684,397.

* cited by examiner

IMPLEMENTING A CONTACT CENTER USING OPEN STANDARDS AND NON-PROPRIETARY COMPONENTS

CROSS-REFERENCE TO RELATED APPLICATIONS

This application is a continuation of U.S. patent application Ser. No. 11/680,304, filed Feb. 28, 2007 (pending), which is incorporated herein in its entirety.

BACKGROUND

The present invention relates to the field of contact centers.

A contact center is a functional area used by one or more organizations to handle inbound/outbound communications with customers. A contact center can facilitate real-time communications that use different interactive modalities, such as voice (e.g., telephone interactions), text (e.g., chat modalities), video, and Web (e.g., co-browsing). Contact centers utilize automated response components that automatically handle routine customer functions, such as providing account balances and the like. Automated response components can also determine subject matter of a customer communication, can ascertain a currently working human contact center agent having requisite skills to handle the customer's needs, and can automatically and dynamically route the customer to that human agent for an interactive communication.

Conventionally, contact centers are implemented using proprietary infrastructure resources (e.g., hardware and software) from vendors. For example, a typical contact center has a dedicated switch, has specialized telephones for agents, has a hardwired computer telephone interface (CTI) between switch and computer equipment, and utilizes proprietary protocols to link infrastructure components. These proprietary solutions have normal proprietary advantages and disadvantages.

One advantage to vendors is that customers are basically locked into a provided solution due to a cost for changing a complete infrastructure from one vendor to a competitor, since vendor solutions are currently incompatible with each other. One disadvantage is that proprietary solutions are often unable to rapidly integrate technological innovations or at least incur substantial cost when adding functionality that takes advantage of new innovations. In a contact center context, new innovations can include software/firmware improvements in VoIP (Voice over Internet Protocol) technologies, media streaming, speech processing, and the like. Hardware innovations, such as feature enhanced telephone and computing terminals, can also be hard for proprietary solutions to utilize due to proprietary communication protocols and hardware links. Solutions which are based upon open standards are able to quickly and cheaply take advantage of new innovations. Further, maintaining skill currency of employees is much less expensive for open solutions than for proprietary solutions. From a customer perspective, current contact center providers are often slow to respond to customer desired improvements (due to proprietary implementation quirks), can be very expensive, and can lack a desired degree of flexibility.

The following example, shown in FIG. 1 (Prior Art), illustrates a conventional implementation of a contact center. FIG. 1 (Prior Art) shows a system 100 where a contact node 105 accesses a contact center implemented using a proprietary architecture 160. The contact node 105 generally consists of a customer using a telephone to dial a telephone number for the contact center. Communications occur over network 150, which can be a Public Switched Telephone Network (PSTN), and are received by a pubic branch exchange (PBX) 110. The PBX 110 routes incoming calls to contact center system implemented using proprietary architecture 160.

Various components can be linked to one another within the proprietary architecture 160 including a Voice Response Unit (VRU) server 120, a computer and telephony integration server (CTI) 126, a workflow manager 128, and an operations center 140. The VRU 120 provides automated voice interactions for callers, which can be provided by speech enabled applications 122 executing on a linked application server 124. The VRU server 120 can be a proprietary solution, which can require speech enabled applications 122 be written in a proprietary language and/or in a proprietary manner.

The CTI server 126 can provide access to enterprise system 127 information, and can be responsible for populating data fields based upon customer input. CTI server 126 can also distribute inbound calls. When calls are routed, the CTI server 126 can ensure that an agent 145 is presented with information, which the caller provided to the VRU server 120. Two key factors in allocating an agent to a caller are skills based routing and queuing. In skills based routing, the agent 145 assigned to a caller needs to have the requisite skills to resolve the customer's problems. In queuing, a caller's wait time should be minimized and incoming calls should be balanced between available agents 145 with appropriate skills.

The workflow manager 128 can track agent availability, can monitor agent/caller interactions, and can acquire and manage metrics for the interactions. The operations center 140, which is often remotely located from a data center, can include a set of agent nodes 144 linked to a center server 142 through a local network 154. Each agent node 144 can include a work station for an agent 145 as well as hardware 146 and software 148. The hardware 146 can be propriety hardware that communicates with the center server 142 using proprietary protocols. The desktop software 148 can also be proprietary, which is designed for a specific vendor. The proprietary nature of the hardware 146 and software 148 generally prevents agents 145 from working off-site, such as from home.

BRIEF SUMMARY

The present invention can be implemented in accordance with numerous aspects consistent with the material presented herein. For example, one aspect of the present invention can include an open contact center formed from multiple contact center components that conform to open standards and that intercommunicate utilizing open standards. The open contact center can provide automated interactive communications with callers, can provide queue management for callers waiting to communicate with live agents, can provide skills based routing for assigning live agents to callers based upon skills of the live agents and skills needed by the callers, and can provide tooling for provisioning and monitoring the live agents. In one configuration, the contact center components can execute within a middleware solution, such as WEBSPHERE, that has IP Multimedia Subsystem capability. Additionally, the contact center components can be implemented as service oriented architecture (SOA) components that communicate over an enterprise service bus (ESB).

Another aspect of the present invention can include a contact center that includes an agent desktop, a portal server, an application server, and a presence server. The agent desktop can include an HTTP browser and a SIP phone each based upon open standards. The agent desktop can permit an agent to handle call center communications from any terminal or location, inside or outside of an operations center. The portal server can provide an agent portal through which an agent utilizing the agent desktop communicates. The agent portal can include multiple agent portlets within which contact center information is presented. The application server can execute contact center applications that are configured to receive input for the contact center applications from the agent portlets and to present contact center output through the agent portlets. The presence server can determine agent availability and can provide the application server with agent specific information including IP addresses for an agent's HTTP browser and SIP phone as well as agent expertise information.

Still another aspect of the present invention can include a call center system that includes one or more contact nodes, one or more agent nodes, zero or more supervisor nodes, and a middleware solution. Each node can include an HTTP browser and a phone. Each node can communicate with the middleware solution over a network using standard communication protocols. The middleware solution can include contact center components that conform to open standards that intercommunicate utilizing open standards. Callers can communicate with the contact center components via one of the contact nodes, live agents can communicate with the contact center components via one of the agent nodes, and supervisors can communicate with the contact center via one of the supervisor nodes.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, or any other recording medium. The program can also be provided as a digitally encoded signal conveyed via a carrier wave. The described program can be a single program or can be implemented as multiple subprograms, each of which interact within a single computing device or interact in a distributed fashion across a network space.

It should also be noted that the methods detailed herein can also be methods performed at least in part by a service agent and/or a machine manipulated by a service agent in response to a service request.

DETAILED DESCRIPTION

Figure 1:
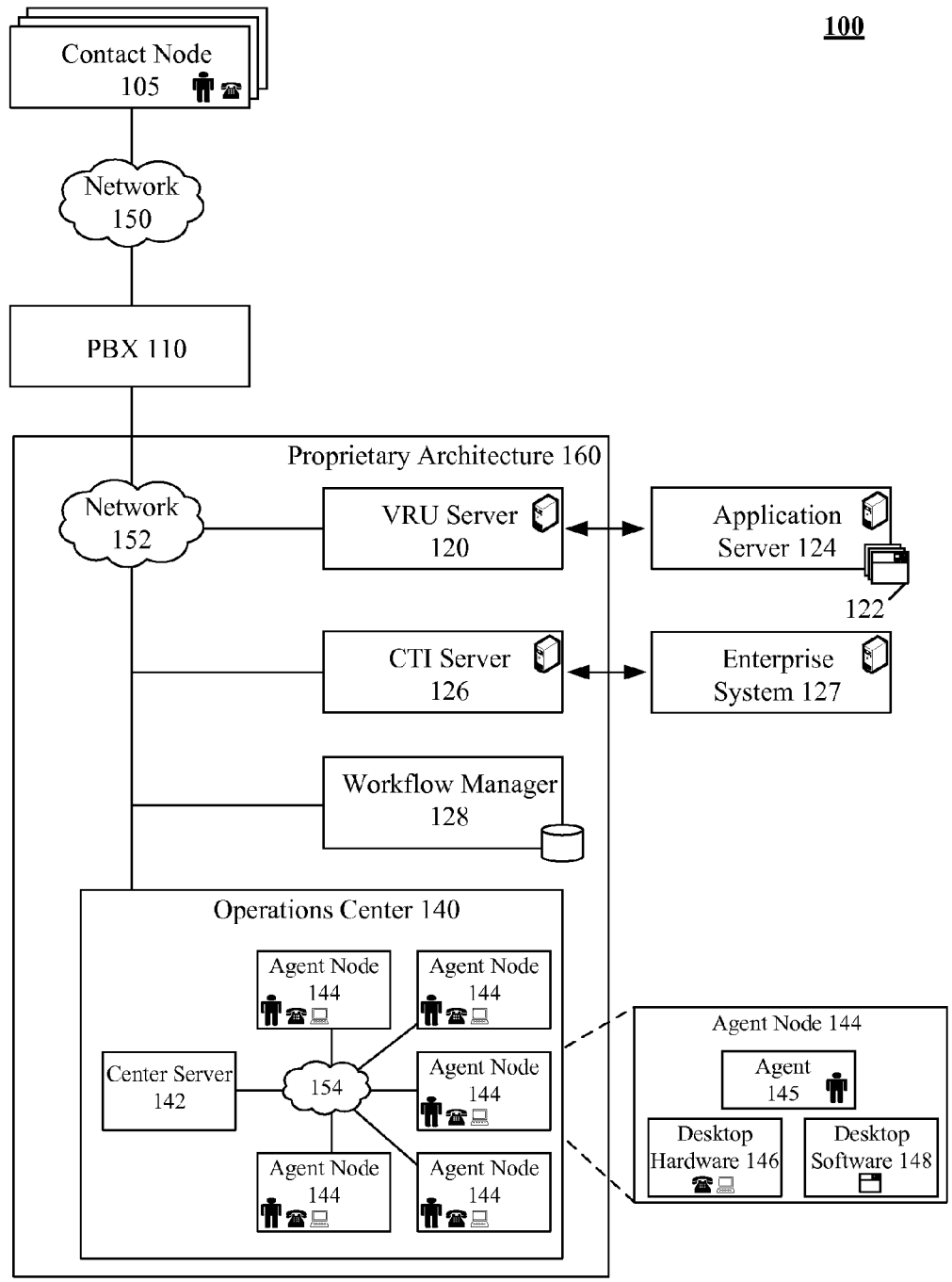
FIG. 1 (Prior Art) illustrates a conventional implementation of a contact center.

The present invention implements contact center functionality utilizing standardized components, which reduces infrastructure costs, adds flexibility, permits interoperability among multiple contact center provider solutions, and makes it easier to quickly and efficiently integrate new technologies to a contact center. In the invention, open standards based components for an agent desktop, agent authentication, agent monitoring, agent transfer, application integration, call queuing, collaboration integration, load balancing, reporting, skills based routing, supervisor conferencing, and the like can be used. Each of these areas can communicate using standard protocols and can be implemented using standard software and hardware. Further, a set of plug-ins can be provided to the open contact center to permit contact center vendors to add vendor specific content and/or vendor specific components, which can be proprietary. The plug-ins can link third party components written in accordance with open contact center standards to the contact center infrastructure (e.g. value added services and enhancements to a core infrastructure) as well as permit standards based contact center components to interoperate with legacy proprietary components, which eases transition from a legacy system to an open one.

As presented herein, an integrated contact center solution can consist entirely of open standardized components and/or can include an amalgamation of open standardized components and proprietary components. Moreover, the open standardized components can be service oriented architecture (SOA) components. Different proprietary components of an integrated contact center solution can be provided by different vendors, each using vendor-specific proprietary technologies that are accessed via appropriate plug-ins. Thus, customers are provided with an ability to choose vendor-specific components without the detriment of being locked-in to a single proprietary solution. Further, use of vendor specific plug-ins permits a graceful upgrade or migration pathway from an existing proprietary solution to the disclosed open solution.

To illustrate, a company having proprietary contact center equipment from a first vendor can acquire assets of a second company having proprietary contact center equipment from a second vendor. Traditionally, the company would either have to separately staff, operate, and maintain two separate sets of contact center equipment or select a single vendor, increase capacity as needed, perform costly data migrations, and discard the non-selected equipment. Customer experienced disruptions would occur through-out the migration. Using the present invention, a base contact center infrastructure can be established using open standardized components. Plug-ins can be used to access proprietary components, which can continue to operate. Over time, proprietary components, such as voice processing, load-balancing, scaling, and call routing components, from each of the vendors can be replaced with open standardized components. At this time, proprietary (and expensive) agent desktop components can continue to be used at the different operating centers (i.e., the first vendor equipment and second vendor equipment can seamlessly interact with the open standardized components), each accessed via a vendor-specific plug-in. Accordingly, the expense and complications of upgrading vendor specific operations center hardware/software can be delayed (perhaps indefinitely) until the acquiring company chooses to upgrade operating center equipment.

Figure 2:
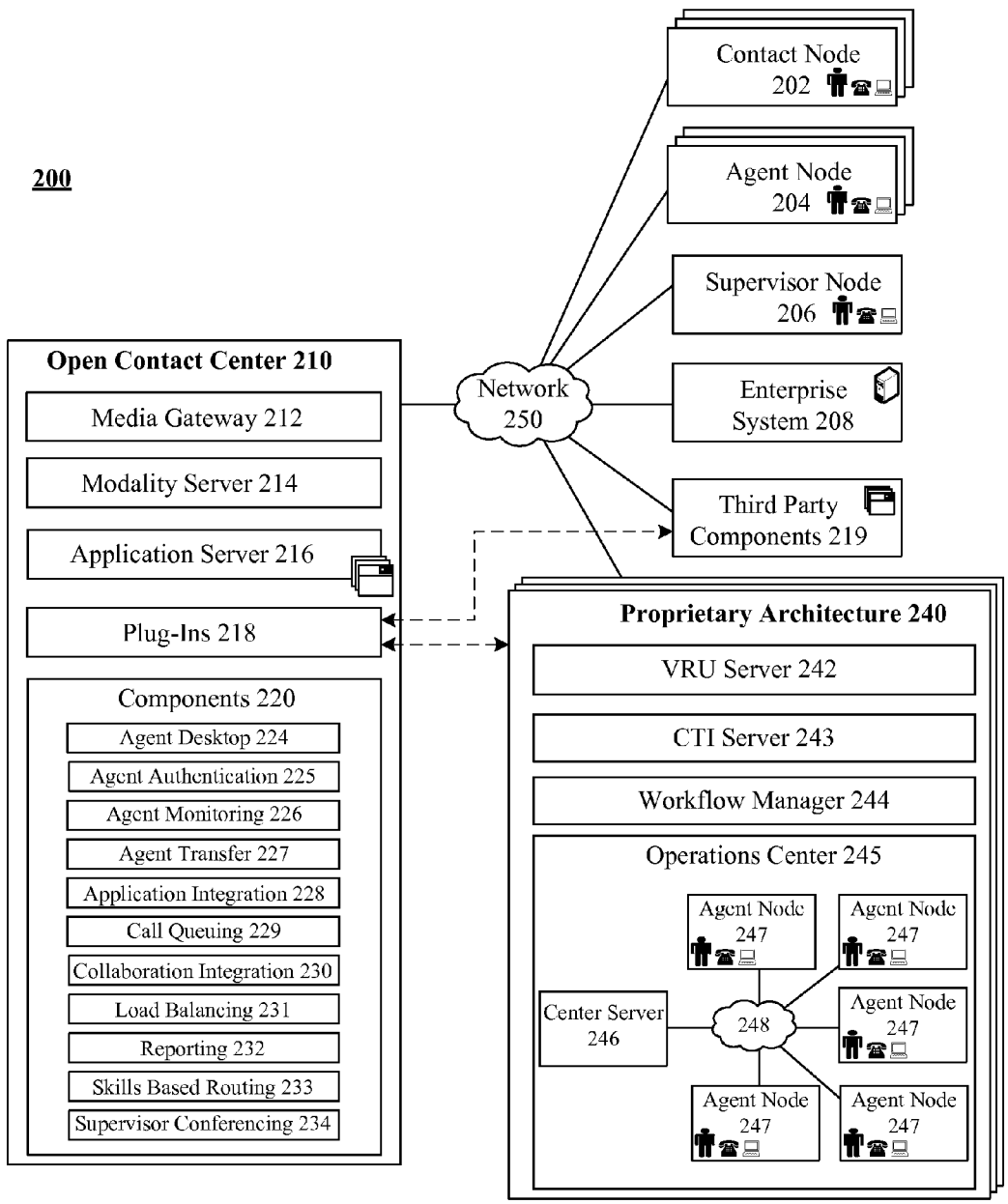
FIG. 2 is a schematic diagram of a system for implementing a contact center based upon open standards in accordance with an embodiment of the inventive arrangements disclosed herein.

FIG. 2 is a schematic diagram of a system 200 for implementing a contact center based upon open standards in accordance with an embodiment of the inventive arrangements disclosed herein. As used throughout this application, open standards indicate that specifics of communication protocols, interfaces with components of the open contact center 210, and the like, are published and available to third party vendors, who can construct solutions or enhancements to the open contact center 210 by conforming to the published standards, such as Extensible Markup Language (XML), service-oriented architecture (SOA), Real-time Transport Protocol (RTP), Media Resource Control Protocol (MRCP), Hyper Text Transfer Protocol (HTTP), Session Initiation Protocol (SIP), and the like. Open standards are often established by an independent standard setting body, such as the Internet Engineering Task Force (IETF), World Wide Web Consortium (W3C), etc., or by a cooperating consortium of multiple independent businesses, such as IBM, Sun Microsystems, and the like. Open standards, as used herein, can exist even though one or more companies maintains intellectual property rights to open contact center 210 concepts, such as those presented in the instant application.

In system 200, a contact node 202 can connect to the open contact center 210 over network 250. The contact node 202 can include a caller communicating with the center 210 via a telephone or a computer user accessing the center 210 via a computer interface. The open contact center 210 can prompt for information regarding the purpose of the communication and assign an agent to handle the communication based upon prompt responses. An assigned agent can be linked to the network 250 and can communicate from an agent node 204. In one embodiment, during a communication session, the open contact center 210 can conference a supervisor node 206 (or additional contact node 202 or agent node 204) into a pre-existing session involving contact node 202 and agent node 204. Additionally, enterprise information 208 can be accessed by one or more of the nodes 202-206 during the session and enterprise system 208 information can be dynamically updated based upon input from a communication node 202-206.

The contact node 202, agent node 204, and/or the supervisor node 206 can each include one or more communication devices linked to the network 250 from which input can be accepted and/or output presented. Hardware/software of each node 202-206 can adhere to open standards, such HTTP for Web based communications, SIP for multimedia and telephony based communications, internet relay chat (IRC) protocol, and the like. Communication devices for the nodes 202-206 can include a phone, a computer, a two-way radio, a text messaging device, and other communication devices. Interaction modalities used by each node 202-206 during a communication session involving the contact center 210 can include voice, text, visual, video, co-browsing, and/or other interactive modalities.

The open contact center 210 can include a media gateway 212, a modality server 214, an application server 216, plug-ins 218, and a set of open standardized contact center components 220. The media gateway 212 acts as a translation unit between disparate telecommunications networks such as PSTN, mobile telephony networks, data networks, Next Generation Networks (NGN), and the like. In one embodiment, the media gateway 212 can be a gateway that permits external communications to interact with components of the center 210, which can each conform to IP Multimedia Subsystem (IMS) standards.

The modality server 214 can be used to match modalities for different nodes 202-206 involved in a communication session, so that when a caller is communicating with a chat interface or a voice interface, an agent to whom the caller is transferred communicates using an equivalent interface. In one embodiment, the modality server 214 can convert input/output formats in real-time so that different modalities can be used by different interacting communicators. Further, in one embodiment, the modality server 214 can be part of composite services architecture within which session state information is maintained irrespective of a modality through which communicators interact.

Application server 216 can be a server that utilizes modular components of a standardized runtime platform. The application server 216 can represent a middleware server of a multi-tier environment. The runtime platform can provide functionality for developing distributed, multi-tier, Web-based applications. The runtime platform can include a collection of related technology specifications that describe required application program interfaces (APIs) and policies for compliance.

In one embodiment, the runtime platform can be a JAVA 2 PLATFORM ENTERPRISE EDITION (J2EE) software platform. Accordingly, the application server 216 can be a J2EE compliant application server, such as a WEBSPHERE application server from International Business Machines Corporation (IBM) of Armonk, N.Y., a BEA WEBLOGIC application server from BEA Systems, Inc. of San Jose, Calif., a JBOSS application server from JBoss, Inc. of Atlanta, Ga., a JOnAS application server from the ObjectWeb Consortium, and the like. The runtime platform is not to be construed as limited in this regard and other software platforms, such as the .NET software platform, are contemplated herein.

A set of plug-ins 218 can be constructed for permitting third parties to add value to the open contact center 210 using third party components 219, each of which is specifically designed for the standards established for the open contact center 210. The plug-ins 218 can interface with third party software components 219. Thus, a third party software provider can develop a supervisor notification procedure (e.g., one example of a third party component 219), which can be used by the open contact center 210 via an appropriate plug-in 218. The third party software 219 can execute remotely from the center 218 or can be deployed and installed within the open contact center 210 and execute locally (e.g., such as a software component deployed and executing within the application server 216).

A different set of plug-ins 218 can be vendor-specific plug-ins designed to interface with proprietary contact center 240 components, which do not inherently conform to the open standards of the contact center 210. That is, plug-ins 218 can be used to bridge from the open contact center 210 to proprietary contact center 240 software/hardware. Different plug-ins 218 can be designed for different components, such as a Voice Response Unit (VRU) 242, the Computer and Telephony Integration (CTI) 243, the workflow manager 244, and/or operations center 245. The operations center 245 can include a set of agent nodes 247 connected to a center server 246 via a network 248, where connections, hardware, software, and/or protocols are proprietary and are specific to a particular vendor. It should be appreciated that different plug-ins 218 for different vendors can be simultaneously utilized.

Instead of accessing contact center software via the plug-ins 218, contact center functionality can be provided by internal standardized components 220. In one embodiment, each of the standardized components can be service oriented architecture (SOA) components. As used herein, a SOA architecture defines structure supporting communications between loosely coupled software services to support requirements of business processes and software users. In this context, a service can be defined as a unit of work to be performed on behalf of some computing entity, such as a human user or another program. Resources in a SOA architecture are made available as independent, self-contained services that are able to be accessed without knowledge of their underlying platform implementation. Accordingly, SOA contact center components 220 can be easily integrated with proprietary or third party components accessed via plug-ins 218. Use of SOA components 220 also makes it easy to integrate new technologies and to selectively utilize/integrate new services, even those provided by third party software providers.

The components 220 can include, but are not limited to, an agent desktop component 224, an agent authentication component 225, an agent monitoring component 226, an agent transfer component 227, an application integration component 227, an application integration component 228, a call queuing component 229, a collaboration integration component 230, a load balancing component 231, a reporting component 232, a skills based routing component 233, and/or a supervisor conferencing component 234. For illustrative purposes, a sample implementation for each of the components 220 are provided below, where the sample implementation is based upon the WEBSPHERE platform. It should be appreciated that the invention is not to be construed as limited to this platform, but the samples are instead provided to clarify specifics of one concrete embodiment of the invention. The invention can, however, be easily adapted for other platforms (e.g., the .NET platform), which are included in the scope of the present invention.

The agent desktop component 224 can include a standard Web browser, such as Internet Explorer, and a phone, such as a SIP based phone. In one embodiment, a set of standard Web pages can provide agent functions, such as login function, a status function (e.g. "active—in call", "active—between calls", "on break", "not active", and other values). The Web pages can be implemented as portlets on a portal server, which are arranged in an agent view. The agent view can vary, based on agent authority. For example, a supervisor agent can have a more extensive view of the call center 210 than other agents, with fewer privileges. In one configuration, the portal server can be provided by the WEBSPHERE Portal Server (PS) or an equivalent solution.

Additionally, the web pages of the agent desktop component 224 can include a LOTUS Lightweight Messaging (LLW) client, which uses the Blocks Extensible Exchange Protocol (BEEP) to receive notifications. Using the LLW client, an agent can sign onto the portal via the agent desktop portlet. Also at login, the agent desktop portlet can call a WEBSPHERE PRESENCE SERVER (WPS) for IBM IMS with a publish/subscribe mechanism. The request can send an IP address of the agent's SIP phone, browser, BEEP address, and other information including expertise about this agent and their utilization. This can accomplish a function of adding the agent to the "routing queue".

It should be emphasized that use of the LLW client and the BEEP protocol is just one contemplated technique for communicating with the agent desktop 224 and that the invention is not to be limited in this regard. That is, any of a variety of other techniques can be substituted that provide approximately equivalent function to LWM and BEEP. For example, Asynchronous JavaScript and XML (AJAX) based clients using HTTP can establish communications with the agent desktop 224 in one contemplated embodiment.

The agent authentication component 225 can identify an agent and upon successful authentication can provide the agent with access to contact center 210 resources. For instance, an agent can login using a user id and password, which is submitted to the contact center using a Web interface. In one embodiment, the authentication function can be provided by WEBSPHERE Application Server (WAS) and Portal Server (PS) JAVA security facilities.

The agent monitoring component 226 can permit call center agents to be monitored for quality assurance or training from virtually any location. In one embodiment, the agent monitoring component 226 can be provided using the WEBSPHERE Portal Server (WPS) and the reporting component 232. For example, agent interactions can be viewed/analyzed using the reporting component 232 for items such as average call handling time, number of calls handled per hour, etc. One of the supervisor's portlets in their Web browser can contain a view of the call center agents, along with access to the agent reporting database, which can include agent specific statistics. The supervisor portlet (accessible via supervisor node 206) can permit a supervisor to access agent information from any Web browser, once the supervisor has been properly authenticated by the agent authentication component 225. In one embodiment, real-time statistics can be provided by the agent monitoring component 226, which can even permit the supervisor to silently conference into/observe a real-time agent/caller interaction. This conferencing may require use of functions of component 234.

The agent transfer component 227 can transfer a communication from an automated response system to an agent, who has suitable skills and availability for handling the communication. In one embodiment, functions of the agent transfer component 227 can be implemented using a SIP Proxy, an agent transfer servlet, a Model Server (MS), a WEBSPHERE PS, and a "Get Agent" composite service. For example, a Voice XML (VXML) application can use a VXML <transfer> tag to transfer a call back to the SIP Proxy server and then onto the selected agent. The SIP Proxy server can receive the call from the VoIP gateway and can transfer it to an available WAS server running WEBSPHERE Voice Enabler (VE). An agent transfer SIP servlet (SIPlet) can run on the SIP Proxy server. The SIPlet can receive the SIP transfer from VE and sends a message to the MS, and specifically to the "Get Agent" service.

The Get Agent service can be provided by the middleware solution provider or a third party. In one configuration, the Get Agent service context information associated with help within the request, such as help for TV repair, etc. "Get Agent" can be a registered composite service in the MS. Invocation of "Get Agent" can cause the MS to send a message to the WEBSPHERE Presence Server (WPS) watchers. The request is to get an agent, based on the expertise required for the HELP context. This can default to a request for an agent in this category that is least used. The default can be overridden to request a preferred agent (if available) that the caller used in a prior call. An agent IP address, whose criteria match that of the request, can be returned by the WPS to the MS. The listener on the model for the "Get Agent" can send a message to the BEEP servlet queue for this agent, putting into that queue a request to take a new call. The Web browser on the agent's desktop can receive the BEEP notification via the LOTUS LWM applet. The visible page can be updated to reflect an incoming call (e.g. "accept call" button flashes). The agent can press the button to accept the call. Pressing the button to accept can send a message to the MS to indicate that the agent is ready to take the call. The agent's screen can update to a view of the caller's information, including what the caller has said during this call along with caller profile information. The MS can return the selected agent's IP address for transfer to the Proxy server agent transfer SIPlet.

The SIPlet can transfer the call to the agent's desktop SIP phone. At this point, transfer is complete and the agent is in control of the call.

The application integration component 228 can integrate applications into the open contact center 210, which can be accomplished using standard J2EE deployment techniques on the WAS infrastructure. Application integration can include integration of composite services, such as the "Get Agent" service. The WEBSPHERE Portal Server (PS) can be used to deploy portlets for the agent desktops via portlet deployment functions. Deployment of WEBSPHERE Presence Server (WPS) watchers can be performed using standard J2EE techniques.

The call queuing component 229 can queue incoming calls utilizing a customizable queuing algorithm. In one embodiment, queuing functions can be provided by WEBSPHERE Presence Server (WPS) for IBM IMS. For instance, at agent login, an agent desktop portlet can call the WPS with a publish/subscribe mechanism. The request can send the IP address of the agent's SIP phone, browser, BEEP address, and other information including expertise about this agent and their utilization. The WPS can maintain queues based on expertise, along with other factors that affect the agent's position in the queue, such as utilization. The queue can be managed by the WPS with business logic tied to a WAS based load balancing and watcher function that has policies to process queued events based on agent desktop based rules.

The collaboration integration component 230 can integrate different users and devices into a call center communication. In one embodiment, the collaboration integration function can be provided by Enterprise Service Bus (ESB) components, SOA components, IBM WORKPLACE, and a composite services model server. IBM WORKPLACE can be the front end of computing that enables users to aggregate data, applications, business processes and people into a single work environment that the users can access from a Web browser, mobile device or server-managed client. WORKPLACE can change how users access the resources they need to do their jobs. Moreover, WORKPLACE can combine new and existing IBM products and technologies, including WORKPLACE products and solutions, LOTUS NOTES and LOTUS DOMINO, IBM WEBSPHERE PORTAL, and WEBSPHERE EVERYPLACE. WORKPLACE can provision these high-performance, role-based environments for users to combine the productivity gains of the desktop with the cost advantages of the network.

The load balancing component 231 can balance customer load among various agents, to minimize time spent waiting in a queue. In one embodiment, the load balancing function can be provided by WEBSPHERE EDGE SERVER LOAD BALANCER (LB) and the WEBSPHERE SIP PROXY SERVER. The LB is can be placed between HTTP and Media Resource Control Protocol (MRCP) endpoints and the SIP PROXY SERVER can be placed between SIP endpoints. The load balancer can route requests to the least loaded, most capable systems in a routing list. Load balancing component 230 can also be capable of performing routing based on the content of the request.

The reporting component 232 can be used to generate reports based upon established and/or user selectable criteria. In one embodiment, the reporting function can be provided by a WAS PERFORMANCE MONITORING INTERFACE (PMI), WAS contained JAVA Management Extensions (JMX) infrastructure components, an IMS reporting mechanism, DB2 UNIVERSAL DATABASE mechanisms, and reporting agents, which can be provided by a third party.

More specifically, reporting carried out by the reporting component 232 can take a variety of avenues. For real-time monitoring, the PMI can provide a capability to monitor in real-time any component of the contact center 210. Non real-time instrumentation can be provided using the JAVA Management Extensions (JMX) infrastructure components contained in WAS. For instance, using the JMX managed bean (MBean) concept, administrators can manipulate key elements of system 200. Using the open JMX standard and WAS, system administrator programs can monitor JMX MBeans of interest. For the contact center, a reporting agent can monitor JMX MBeans of interest and update a DB2 UNIVERSAL DATABASE. For example, for customer billing records, call completion by automation can be obtained from a JMX MBean for VE. So a third party agent WAS component can be created to query the VE JMX MBeans of interest and update a billing DB2 database. Another capability of the reporting component 232 can be in the IMS elements themselves employed by the open contact center 210. IMS has defined a reporting mechanism which includes Call Detail Records (CDRs) generated by the Charging Collection Function (CCF), or the Event Charging Function (ECF).

The skills based routing component 233 can determine agents to whom communications are to be routed based upon agent skills. In one embodiment, the skills based routing function can be provided by the WEBSPHERE Presence Server (WPS) for IBM IMS. For example, an agent desktop portlet can call the PS using the publish/subscribe mechanism. The request can send the IP address of an agent's SIP phone, browser, BEEP address, and other information including expertise about this agent and their utilization. Contact center agents can register with the WPS, which causes watchers to be created. Watchers can be created whenever a new expertise is added to the WPS. Watchers can be plug-ins of the WPS. A watcher can watch the expertise of the agents. The watcher can be a piece of code that listens. It listens on an event package ("presentity" XML file). A user can be registered with a PS. This agent notion changes the algorithm, as watchers watch the expertise, and not the agent itself. This changes the typical logic of the watcher from conventionally implemented ones. Watchers can be added via a plug-in mechanism to WPS, so third party content can be integrated. A unique watcher can be provided for each unique expertise. For example, looking for an agent experienced with "TV repair". A single agent can have multiple skills or expertise and can therefore be associated with multiple watchers.

The supervisor conferencing 234 component can be used to conference in a supervisor or a supervisor node 206 to an existing communication session. The supervisor node 206 can be added with or without agent and/or communicator knowledge. In one embodiment, the supervisor conferencing function can be provided by WEBSPHERE Portal Server (WPS) which uses composite services Model Server (MS), a conference servlet, and the SIP phone on the agent desktops along with the VE CCXML conferencing capability.

For example, an agent can monitor any call in the call center based on the agent's permission level. The user identifier that the agent uses to login will affect the functions available to the agent. One of the supervisor's portlets can be a view of the calls that are in-progress in the contact center. This information can be populated via a query to the MS, and includes a notification mechanism for change. The supervisor conferencing component 234 can permit a supervisor to select any communication and to obtain a detailed view of the communication. The supervisor can also listen to any call, by clicking on a listen button for the call in progress. The listen button can send a message to VE to conference the supervisor into the call. The supervisor can be "on mute" if desired. The VE can use the CCXML conference support to tie the supervisor into the call. The VE can send a conference request back to the originator of the call, which for VE is the SIP Proxy server. There, a conference servlet can send a message to the media gateway 212 to duplex the audio stream to the supervisor's RTP endpoint. Once done, the supervisor can listen into the selected call.

It should again be emphasized that although component 220 implementation specifics for one contemplated embodiment have been described using IBM WEBSPHERE middleware, the invention is not so limited. Any middleware solution or standards based solution can be used in place of the IBM WEBSPHERE specific components described herein, using adaptations and software techniques commonly performed by software engineers and developers, which do not require undue experimentations or inventive efforts. That is, from the above, it can be readily realized that open control center 210 implementation specifics can depend highly upon middleware that performs the call center functions.

The illustrated implementation shows that traditionally proprietary functionality can be achieved by functionality inherent in many conventional middleware solutions, such as WEBSHERE. Additional standardized components can be integrated to a selected middleware solution to provide additional functions. For example, plug-ins 218 can be provided that permit vendor specific, proprietary contact center 240 components to be used, which permit a staged or gradual implementation of system 200 from a pre-existing proprietary solution.

It is expected that present day middleware components will evolve over time, and implementation specifics for the open contact center 210 will similarly evolve. Importantly, the use of standardized components, such as IMS based components, SOA components, composite services components and the like, permit the contact center 210 to quickly integrate and utilize emerging technologies, unlike proprietary contact centers 240 of today, which must convert and adapt emerging technologies into proprietary architectures and protocols, which is time consuming, expensive, and often results in a loss of functionality.

Figure 3:
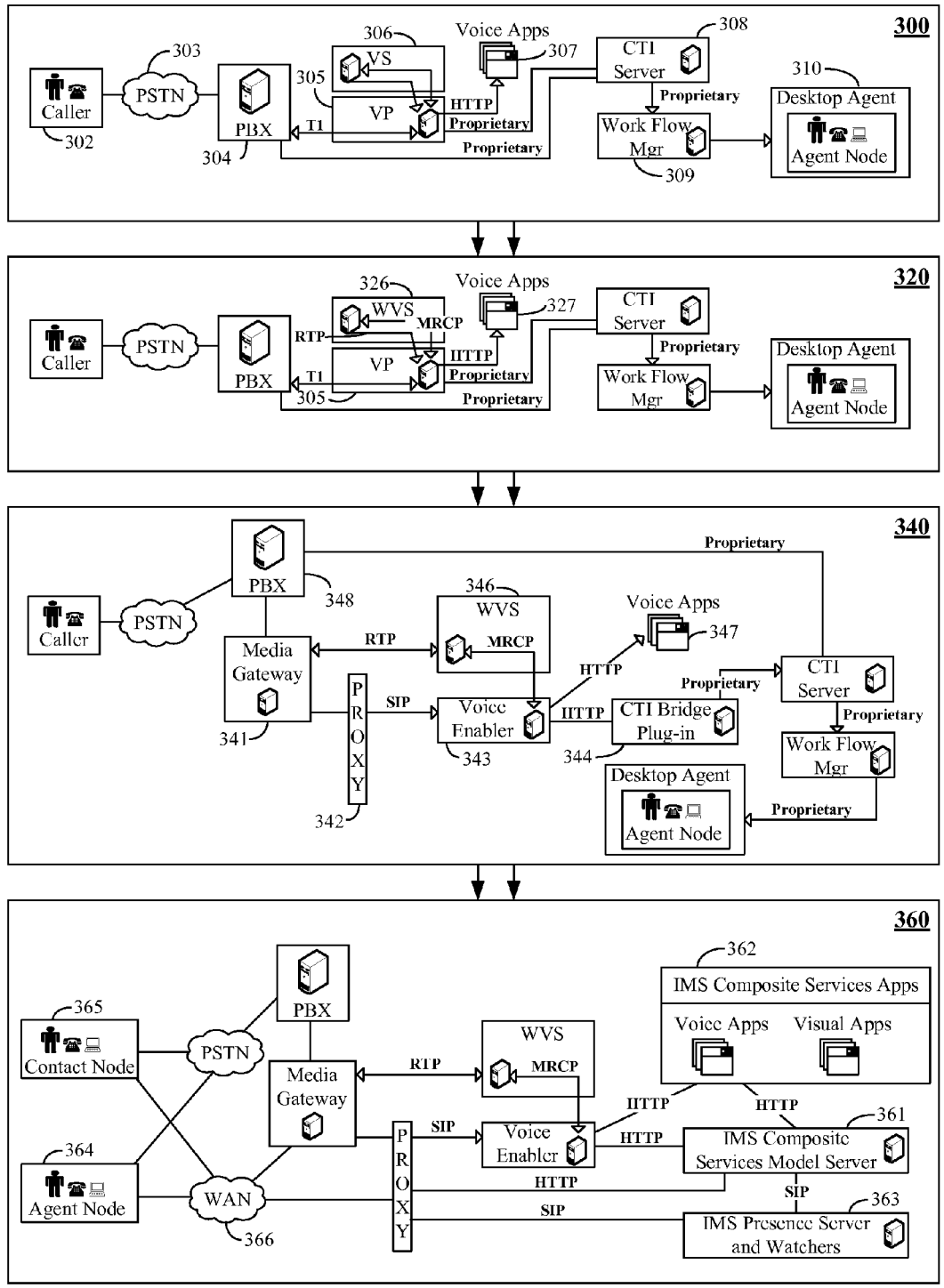
FIG. 3 is a schematic diagram showing a series of stages for evolving a proprietary contact center to an open contact center in accordance with an embodiment of the inventive arrangements disclosed herein.

FIG. 3 is a schematic diagram showing a series of stages 300, 320, 340, and 360 for evolving a proprietary contact center to an open contact center in accordance with an embodiment of the inventive arrangements disclosed herein. Appreciably, the stages shown in FIG. 3 represent just one potential evolution pathway and others are possible. That is, the use of plug-ins 218 to access legacy or proprietary contact center 240 components permit a contact center operator to systematically replace proprietary components with functionally equivalent components 220 in a progressive manner while maintaining an operational system.

In stage 300, a pure proprietary contact center system is shown. Stage 300 links a caller 302 to a PBX 304 via a PSTN network 303. The PBX 304 is linked to a proprietary voice portal (VP) 305 through a T1 connection. The VP 305 can use a proprietary voice server 306 to execute voice applications 307, which can include proprietary code and/or extensions. A proprietary communication link can exist between VP 305 and a CTI server 308. A further proprietary link can exist between the CTI server 308 and a proprietary work flow manager 309, which is in turn connected to a proprietary desktop agent 310, which includes one or more agent nodes.

In stage 320, proprietary applications of stage 300 can be ported to a standard, non-proprietary language, such as VXML. Standardizing the voice applications 327 can require the proprietary voice server 306 to be replaced with an open standards voice server 326. The new voice server 326 can exchange information with the VP 305 using open standards, such as Real Time Protocol (RTP) based standards and Media Resource Control Protocol (MRCP) based standards.

In stage 340, proprietary interactive voice response (IVR) components (e.g., VP 305) can be replaced using an open standard component, such as IBM's VOICE ENABLER 343 and WEBSPHERE voice server 346. Voice server 346 may have been replaced in step 320, depending on whether the applications 327 required such a replacement to continue operating. If the proprietary voice server 306 was able to interpret applications 327, its substitution could be delayed until stage 340. Either way, the voice server 346 can interpret VXML applications 347 in stage 340.

Initially, WVS 346 can be used with VE 343 for handling Dual-Tone-Multi-Frequency (DTMF) input and pre-recorded audio, which may be sufficient for porting pre-existing IVR applications 347. Once the existing applications have been ported, additional speech processing capabilities can be added to the applications 347, such as automatic speech recognition (ASR) capabilities, text-to-speech capabilities, and the like. In one optional embodiment, speaker authentication and verification functions based upon voice identification technologies can be added using voice server 346.

Additionally, a proxy 342, such as WAS EDGE SERVER LOAD BALANCER or WAS SIP PROXY can be used in front of the voice enabler 343. A media gateway 341 can be placed between a PBX 348 and the proxy 342. Accordingly, stage 340 can incorporate CCXML for most basic call provisioning (e.g., DNIS to VXML application). The CCXML applications can reside on a WAS type application server with the VXML applications 347.

Further, a CTI bridge 344 or plug-in can be used to link the VE 343 to proprietary call center components, such as a CTI server. If multiple different vendor-specific solutions need to be integrated, different bridges 344 or plug-ins can be used.

In stage 360, now that open standards based voice aspects have been integrated into the contact center, other proprietary components (i.e., CTI server 308, workflow manager 309, and desktop agent 310) can be replaced by open standards based components. First proprietary database (not shown) storing contact center information can be replaced with a standard database, such as DB2 UNIVERSAL DATABASE. At this time, database tables can be re-built, data can be migrated, scripts can be ported, and the like.

An IMS composite services model server 361 can then be added, which handles IMS composite services applications 362, which can replace single modality applications 347. Contact nodes 365, which can include new methods for callers to interact with the contact center, such as instant messaging, Web form interactions during sessions, and the like, can be added at this time. Additional agent facing composite service applications can also be created, which permit agent nodes 364 to access the contact center system. Initially, basic agent services 362 can be created that cover functionality originally provided by a proprietary contact center (310). Enhanced agent functions can then be systematically added. The agent node 364 can connect using standard telephony connections (PSTN) and/or a standard data connection (WAN 366). The new agent node 364 can use standard hardware and software, such as a SIP phone and Web browser with LOTUS LWM and BEEP. AJAX and HTTP or other communication techniques for exchanging information with the agent node 364 can be used in place of LWM and BEEP. WEBSPHERE PS and agent portlets can be added and security can be enabled. IMS presence server and watchers 363 can be added to detect available agents and their skills and to monitor contact center interactions. In one embodiment, collaboration components, which can be implemented using IBM WORKPLACE or other such components, can be added to the open contact center infrastructure.

Figure 4:
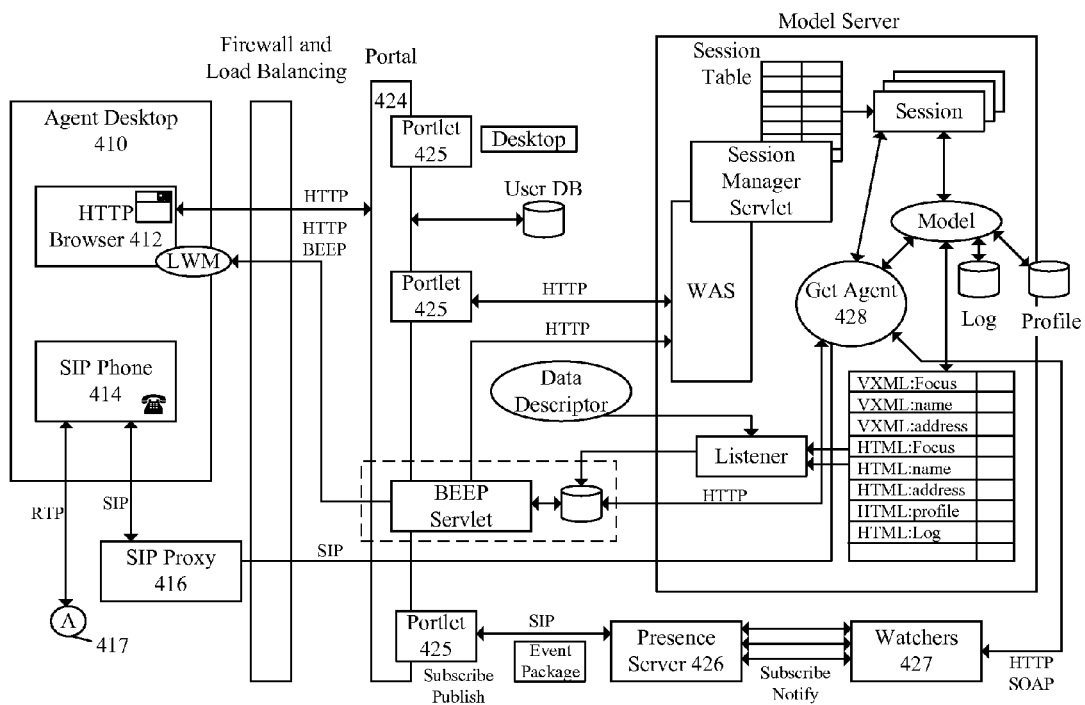
FIG. 4 is a schematic diagram of a standards based contact center from an agent perspective that is implemented using WEBSPHERE enabled components and associated tooling in accordance with an embodiment of the inventive arrangements disclosed herein.

FIG. 4 is a schematic diagram of a standards based contact center 400 from an agent perspective that is implemented using WEBSPHERE enabled components and associated tooling in accordance with an embodiment of the inventive arrangements disclosed herein. Center 400 represents one particular embodiment for system 200. Components illustrated for center 400 are consistent with the concrete examples described for components 220. It should be noted that center 400 utilizes WEBSPHERE enabled components for illustrative purposes only and the scope of the invention is not to be construed as limited in this regard. Other middleware solutions and open standards based solutions can be substituted and adapted to achieve approximately equivalent results.

An illustrative scenario for center 400 can show how the components interact. In this scenario, a call can come in over a telephone to the contact center 400 using a standard telephone, where the call is transferred to an agent connected to contact center components using agent desktop 410. The agent can utilize any personal computer in an operations center as the agent desktop 410 and is not trained to a particular station. The agent can also remotely (i.e., external to an operations center, such as through a home computer) connect to contact center components using a Web browser 412 and SIP based telephone 414. The agent can sign onto portal 424 via an agent desktop portlet 425. For example, the agent can enter a user id and password and hit a SUBMIT button.

The desktop agent 410 portlet can call the WEBSPHERE PRESENCE SERVER (WPS) 426 with a publish/subscribe mechanism. An IP address of the agent's SIP phone 414, browser 412, BEEP address, and other information including agent expertise and agent utilization can be conveyed to the presence server 426. After login onto the system, a default screen can be presented in the browser 412 that indicates that the agent is active and available.

Figure 5:
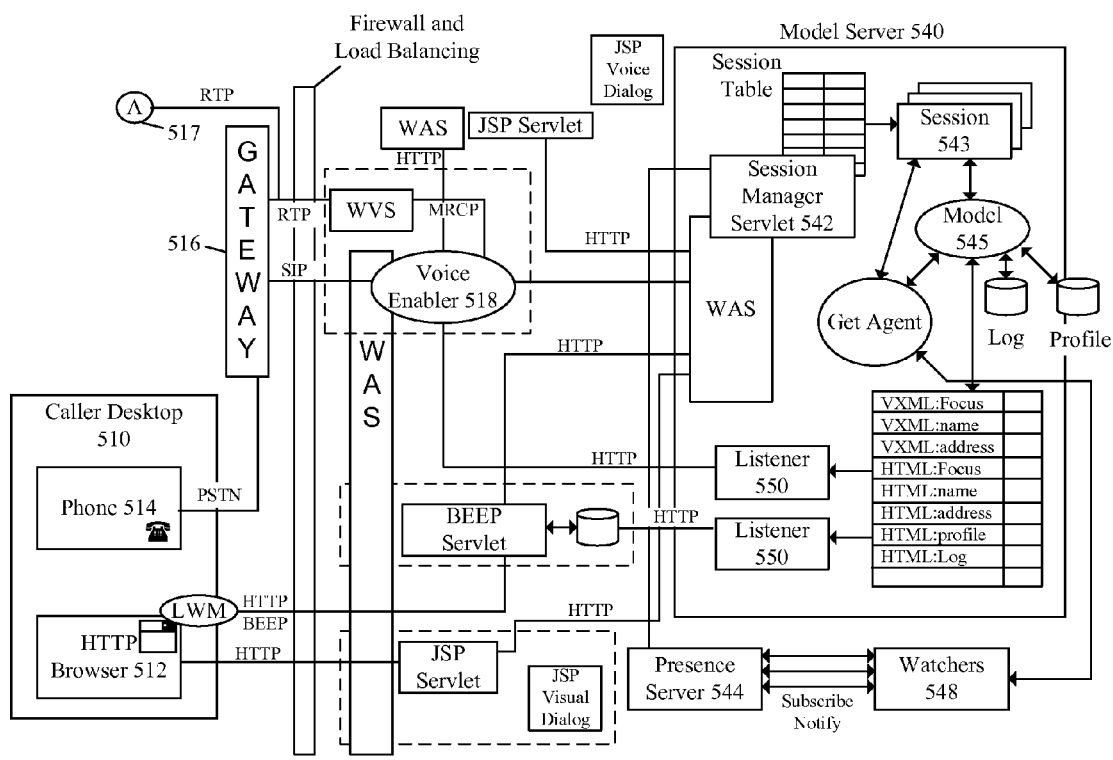
FIG. 5 is a schematic diagram of a standards based contact center from a customer perspective that is implemented using WEBSPHERE enabled components and associated tooling in accordance with an embodiment of the inventive arrangements disclosed herein.

At this time, a call between a caller on a phone and the contact center 400 can be active. In a running VXML application, the VE can prompt a user for input. The VE can interact with the WEBSPHERE VOICE SERVER to determine user context information and a purpose of a call. The caller responses can indicate that agent assistance is needed. For example, a caller can select a dialog option to speak with a live agent. The VXML application can transfer the caller to an agent transfer servlet co-located with the SIP proxy 416. Connector A (417), which continues in FIG. 5 illustrates this connection. Once the transfer is made, the agent can receive the call using the SIP phone 414 and can receive caller specific data via the browser 412.

Two key services used to allocate an agent to a caller are skills based routing and queuing. The presence server 426 allows a rules-based service in the assignment of registered agents based upon rich presence information. The watchers 427 along with network dispatcher load balancing allow for rule based services in the queuing a distribution of call requests. The VE in conjunction with SIP information can provide the necessary information for the get agent 428 service.

It should be noted that middleware programming interfaces of contact center 400 allow for custom services to be created for contact center operations. These services can be provided by the middleware provider and/or by third party providers, which include traditional vendors of contact center solutions. The presence server 426 subscription function permits the dynamic registration of agents and agent capabilities. Further, the rich presence function of the server 426 can permit real-time status metrics on agent operations. Generally, contact center 400 encourages the interoperation of services provided by different sources, which permits the contact center 400 to gracefully evolve and to use best practices and applications tailored to the specific needs of the business or organization for which the contact center 400 is implemented.

Further, the arrangements of contact center 400 permit knowledge brokering and independent agent services to be provided to a multitude of business entities. That is, agents can operate as independent knowledge brokers, who sell their knowledge and services in a manner analogous to how goods/merchandise are sold today. Thus, contact center 400 can connect people with knowledge to sell, such as doctors, lawyers, and other professionals, to those willing to pay for this knowledge (i.e., callers or communicators contacting the call center). Businesses can utilize these independent contractors to handle difficult problems that dedicated staff is unable to handle, to handle overflow to ensure that queue wait times remain under a configurable duration, and to offer an unprecedented level of contact center flexibility. The open standards based nature of center 400 permits the seamless integration of independent knowledge brokers and dedicated personnel in a fashion transparent to callers. In short, higher quality contact center services can be provided at less costs using center 400 than is possible using conventionally implemented contact centers.

FIG. 5 is a schematic diagram of a standards based contact center 500 from a customer perspective that is implemented using WEBSPHERE enabled components and associated tooling in accordance with an embodiment of the inventive arrangements disclosed herein. Center 500 represents one particular embodiment for system 200. Components illustrated for center 500 are consistent with the concrete examples described for components 220. It should be noted that center 500 utilizes WEBSPHERE enabled components for illustrative purposes only and the scope of the invention is not to be construed as limited in this regard. Other middleware solutions and open standards based solutions can be substituted and adapted to achieve approximately equivalent results.

An illustrative scenario for center 500 can show how the components interact. In this scenario, a caller can use caller desktop 510 to telephone a contact center using a standard phone 514 and/or can communicate using a browser 512 (e.g., chat, text messaging, Web forms, or other form of interaction). The scenario can begin when the caller phones the contact center using phone 514. The call can come in over a PSTN connection and can be sent to a VoIP/media gateway 516. From there, the call can pass through a WAS SIP proxy as a SIP INVITE message, which is forwarded to the VE 518. The VE 518 can inform the composite services model server 540 (i.e., over a HTTP communication) that a new call session has started.

A session manager servlet 542 can call an IM presence server 544 to determine capabilities (e.g., clients/modalities) of the caller desktop 510 (assuming the desktop 510 has been authenticated) and to acquire IP address and protocol types (e.g., SIMPLE for IM, HTTP for browser 512) of the desktop 510. This obtained information can be stored in the model server (MS) 540 along with the VE 518 IP hostname for this call/session 543. An associated model 545 can also be updated based upon previously stored information (e.g., name and address information can be previously logged from a prior session).

The session manager servlet 542 can then set a voice channel as active in the IMS presence server 544. Activation indicates that the caller's phone 514 is being utilized and is not just available. The presence server 544 can set a watcher 548 for an event package on a person. The MS 540 can add a listener 550 for voice modality hooks to point to the VE 518 hostname for XML Configuration Access Protocol (XCAP) messages. Triggers can be established for all values for which the listener 550 is listening. All appropriate listening information and associated triggers can be sent to the VE 518.

At this point, model 545, session 543, and presence server 544 settings have been set to values associated with a live call. One of these values can include focus, which can be set to synchronize HTTP and VXML focus. The caller can now interact with the contact center 500, providing responses to automated prompts. These responses can result in a transfer (illustrated by Connector A (517)) to a live agent, details for which are provided in FIG. 4.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A system for an open contact center comprising:
one or more processors;
one or more computer memories storing a plurality of contact center components each comprising a set of program instructions, wherein said contact center components conform to open standard, wherein said contact center components when executed by the one or more processors intercommunicate with each other utilizing open standards, said components together forming an open contact center, said open contact center providing automated interactive communications with callers, providing queue management for callers waiting to communicate with live agents, providing skills based routing for assigning live agents to callers based upon skills of the live agents and skills needed by the callers, and providing tooling for provisioning and monitoring the live agents, wherein each of the contact center components are service oriented architecture (SOA) components, wherein the contact center components intercommunicate via an enterprise service bus (ESB), and wherein each of the contact center components execute independent of other ones of the contact center components within a middleware solution having Internet Protocol (IP) Multimedia Subsystem (IMS) capabilities.

2. The system of claim 1, wherein said contact center components include at least seven components selected from a set of components consisting of an agent desktop component, an agent authentication component, an agent monitoring component, an agent transfer component, an application integration component, a call queuing component, a collaboration integration component, a load balancing component, a reporting component, a skills based routing component, and a supervisor conferencing component.

3. The system of claim 1, wherein said contact center components include at least nine components selected from a set of components consisting of an agent desktop component, an agent authentication component, an agent monitoring component, an agent transfer component, an application integration component, a call queuing component a collaboration integration component, a load balancing component, a reporting component, a skills based routing component, and a supervisor conferencing component.

4. The system of claim 1, wherein said contact center components include an agent desktop component, an agent authentication component, an agent monitoring component, an agent transfer component, an application integration component, a call queuing component, a collaboration integration component, a load balancing component, a reporting component, a skills based routing component, and a supervisor conferencing component.

5. The system of claim 1, wherein said contact center components include at least five components selected from a set of components consisting of an agent desktop component, an agent authentication component, an agent monitoring component, an agent transfer component, an application integration component, a call queuing component, a collaboration integration component, a load balancing component, a reporting component, a skills based routing component, and a supervisor conferencing component.

6. The system of claim 1, further comprising:
a set of vendor specific plug-ins each configured to communicate with a proprietary contact center component to permit the open contact center to utilize capabilities provided by the proprietary contact center component.

7. The system of claim 6, wherein the contact center is configured to simultaneously utilize a plurality of different vendor specific plug-ins, wherein the different vendor specific plug-ins correspond to proprietary contact center components provided by different vendors.

8. The system of claim 6, further comprising: an agent desktop comprising an Hypertext Transfer Protocol (HTTP) browser and a Session Initiation Protocol (SIP) based phone each based upon open standards, wherein the agent desktop is configured to operate as an interface between the live agent and the open contact center.

9. The system of claim 6, further comprising:
a composite services model server configured to maintain session and model information for communications between the live agents and the callers.

10. A system for an open contact center comprising:
an agent desktop comprising an Hypertext Transfer Protocol (HTTP) browser and a Session Initiation Protocol (SIP) phone each based upon open standards, wherein the agent desktop is configured to permit an agent to handle call center communications;
a portal server, comprising hardware and software stored in a memory executing upon the hardware, configured to provide an agent portal, through which an agent utilizing the agent desktop communicates, said agent portal including a plurality of agent portlets within which contact center information is presented;

an application server, comprising hardware and software stored in a memory executing upon the hardware, executing contact center applications configured to receive input for the contact center applications from the agent portlets and to present contact center output through the agent portlets; and a presence server, comprising hardware and software stored in a memory executing upon the hardware, configured to determine agent availability and configured to provide the application server with agent specific information including IP addresses for an agent's Hypertext Transfer Protocol (HTTP) browser and Session Initiation Protocol (SIP) phone as well as agent expertise information, wherein the portal server, the application server and the presence server conform to open standards.

11. The system of claim 10, wherein the presence server, the application server, and the portal server are together configured to permit incoming calls to be handled by dedicated live agents as well as independent knowledge brokers each operating from one of the agent desktops within which the agent or broker has logged, wherein caller transfers by the contact center are directed towards either one of the dedicated live agents or one of the independent knowledge brokers in a manner transparent to callers.

12. The system of claim 10, wherein the contact center provides automated interactive communications with callers, provides queue management for callers waiting to communicate with live agents, provides skills based routing for assigning live agents to callers based upon skills of the live agents and skills needed by the callers, and provides tooling for provisioning and monitoring the live agents.

13. The system of claim 10, wherein the software and hardware of the contact center is based upon open standards, which permit the contact center to operate without reliance on proprietary communication protocols, without reliance upon proprietary, vendor-specific contact center hardware, and without reliance upon vendor-specific contact center software.

14. The system of claim 12, further comprising:
a set of application server plug-ins, each configured to communicate with at least one of a third party component and a proprietary contact center component to permit the contact center to utilize capabilities provided by the component associated with the plug-in, whereby legacy proprietary equipment is able to interoperate using vendor specific plug-ins with the open standards based equipment of the contact center to permit graceful migration from a legacy contact center equipment to the standards based contact center, and whereby value added software by third parties is able to extend functionality of the contact center through use of plug-ins.

15. The system of claim 10, wherein the portal server, the application server, and the presence server are part of a middleware solution having Internet Protocol (IP) Multimedia Subsystem (IMS) capabilities.

16. The system of claim 10, wherein the portal server, the application server, and the presence server are implemented within a service oriented architecture (SOA) infrastructure and wherein the contact center applications are SOA applications.

17. A call center system comprising:
at least one contact node comprising at least one of an Hypertext Transfer Protocol (HTTP) browser and a Public Switched Telephone Network (PSTN) telephone;

least one agent node comprising an Hypertext Transfer Protocol (HTTP) browser and a Session Initiation Protocol (SIP) phone;

a middleware solution including a plurality of contact center components conforming to open standards that intercommunicate utilizing open standards, said contact center components together forming an open contact center, said open contact center providing automated interactive communications with callers, providing queue management for callers waiting to communicate with live agents, providing skills based routing for assigning live agents to callers based upon skills of the live agents and skills needed by the callers, and providing tooling for provisioning and monitoring the live agents, wherein said callers communicate with the contact center components via one of the contact nodes and said live agents communicate with the contact center components via one of the agent nodes, and wherein each contact node and each agent node communicate with the middleware solution over a network using standard communication protocols.

18. The call center system of claim 17, further comprising:
at least one supervisor node comprising an Hypertext Transfer Protocol (HTTP) browser and a Session Initiation Protocol (SIP) phone each configured to communicate with the middleware solution over the network using standard communication protocols, wherein the contact center components comprise a supervisor conferencing component configured to permit an authorized supervisor using one of the supervisor nodes to conference into a real-time communication session between one of the contact nodes and one of the agent nodes.

19. The call center system of claim 17, wherein said contact center components include at least five components selected from a set of components consisting of an agent desktop component, an agent authentication component, an agent monitoring component, an agent transfer component, an application integration component, a call queuing component, a collaboration integration component, a load balancing component, a reporting component, a skills based routing component, and a supervisor conferencing component.

20. The call center system of claim 17, wherein said middleware solution further comprises:
a portal server configured to provide an agent portal, through which an agent utilizing the agent node communicates, said agent portal including a plurality of agent portlets within which contact center information is presented;

an application server executing contact center applications configured to receive input for the contact center applications from the agent portlets and to present contact center output through the agent portlets; and a presence server configured to determine agent availability and configured to provide the application server with agent specific information including Internet Protocol (IP) addresses for an agent's Hypertext Transfer Protocol (HTTP) browser and Session Initiation Protocol (SIP) phone as well as agent expertise information.

* * * * *